United States Patent [19]

Kalfayan et al.

[11] Patent Number: 5,051,197

[45] Date of Patent: * Sep. 24, 1991

[54] SCALE REMOVAL TREATMENT

[75] Inventors: Leonard J. Kalfayan, Claremont; David R. Watkins, Irvine; Gregory S. Hewgill, Chino, all of Calif.

[73] Assignee: Union Oil Company of California, Los Angeles, Calif.

[*] Notice: The portion of the term of this patent subsequent to Feb. 12, 2008 has been disclaimed.

[21] Appl. No.: 595,104

[22] Filed: Oct. 10, 1990

Related U.S. Application Data

[60] Continuation of Ser. No. 311,378, Feb. 15, 1989, Pat. No. 4,992,182, and a continuation of Ser. No. 77,305, Jul. 24, 1987, abandoned, which is a division of Ser. No. 800,532, Nov. 21, 1985, Pat. No. 4,708,207.

[51] Int. Cl.$^5$ .............................. 252 8.552; 252 8.553; 252 389.31; 252 390
[52] U.S. Cl. .............................. 252/8.552; 252/8.553; 252/389.31; 252/390; 166/295; 422/12
[58] Field of Search ............. 252/8.552, 8.553, 389.31, 252/390; 166/295; 422/12

[56] References Cited

U.S. PATENT DOCUMENTS

| | | |
|---|---|---|
| 2,877,848 | 3/1959 | Case . |
| 3,146,252 | 8/1964 | Emblem et al. ............... 260/448.8 |
| 3,234,144 | 2/1966 | Morehouse ...................... 252/389 |
| 3,458,555 | 7/1969 | Dathe et al. ..................... 260/448.2 |
| 3,497,010 | 2/1970 | Copeland ......................... 166/295 |
| 3,554,952 | 1/1971 | Plueddemann ................... 260/29.2 |
| 3,632,524 | 1/1972 | Muzyczko et al. ............... 252/392 |
| 3,676,340 | 8/1972 | Berg et al. ........................ 252/875 |
| 3,684,720 | 7/1972 | Richardson ...................... 252/82 X |
| 3,793,209 | 2/1974 | Thompson ....................... 252/8.553 |
| 3,854,533 | 12/1974 | Gurley et al. .................... 166/276 |
| 3,933,672 | 1/1976 | Bartolotta et al. ............... 252/89 X |
| 4,019,992 | 4/1977 | Krueger ........................... 252/390 |
| 4,030,548 | 6/1977 | Richardson et al. ............. 166/279 |
| 4,215,000 | 10/1980 | DeJong et al. ................... 252/8.552 |
| 4,276,185 | 6/1981 | Martin ............................. 252/8.552 |
| 4,446,035 | 9/1984 | Barrat et al. ..................... 252/8.8 |
| 4,466,896 | 1/1984 | Darden ............................. 252/78.3 |
| 4,479,543 | 10/1984 | Kalfayan et al. ................. 166/300 |
| 4,495,996 | 1/1985 | Meyers et al. ................... 166/279 |
| 4,498,538 | 2/1985 | Watkins et al. .................. 166/295 |
| 4,498,539 | 2/1985 | Bruning ............................ 166/294 |
| 4,552,217 | 11/1986 | Wu et al. .......................... 166/270 |
| 4,553,597 | 11/1985 | Le Ribault et al. .............. 166/208 |
| 4,646,835 | 3/1987 | Watkins et al. .................. 166/295 |
| 4,666,528 | 1/1987 | Arrington et al. ............... 134/2 |
| 4,787,453 | 3/1988 | Hewgill ............................ 166/272 |

FOREIGN PATENT DOCUMENTS

| | | | |
|---|---|---|---|
| 560977 | 10/1958 | Canada ............................ | 252/82 |
| 3284298 | 4/1988 | Japan ............................... | 252/82 |
| 500290 | 1/1976 | U.S.S.R. .......................... | 252/82 |

OTHER PUBLICATIONS

Gidley, *Journal of Petroleum Technology*, pp. 551–558 (May, 1971).

Allen et al., *Production Operations*, Well Completions, Workover, and Stimulation, vol. 2, Third Edition, pp. 145–147 and 152, (1978).

"Chemistry of the Metal Chelate Compounds" Marten and Calvin, 1952, p. 536.

C. M. Shaughnessy and W. E. Kline, "EDTA Removes Formation Damage at Prudhoe Bay," *Journal of Petroleum Technology*, Oct., 1983, pp. 1783–1791.

*Primary Examiner*—John S. Maples
*Assistant Examiner*—Chhaya Sayala
*Attorney, Agent, or Firm*—Gregory F. Wirzbicki; Shlomo R. Frieman

[57] ABSTRACT

An aqueous composition comprises an aminopolycarboxylic acid and a water-soluble organosilicon compound. The composition is useful for removing scale from well equipment and/or openings in a subterranean formation, and for stabilizing fine particles within the formation to prevent their subsequent movement. Fluid flow through formations and wells treated with the composition tends to be increased and more stable.

16 Claims, No Drawings

SCALE REMOVAL TREATMENT

This application is a continuation of U.S. patent application Ser. No. 07/311,378, filed Feb. 15, 1989, now U.S. Pat. No. 4,992,182 which is a continuation of U.S. patent application Ser. No. 07/077,305, filed July 24, 1987, now abandoned, which is a divisional of U.S. patent application Ser. No. 800,532 filed Nov. 21, 1985, now U.S. Pat. No. 4,708,207.

BACKGROUND OF THE INVENTION

1. Field of the Invention

This invention relates to the introduction of fluids into subterranean formations, more particularly to scale removal in the formations and stabilization of formation fine particles against movement.

2. Description of the Art

A long-recognized problem in producing fluids such as water and/or oil from subterranean formations is scale deposition. One very common scale is based upon calcium carbonate, which precipitates from pressurized aqueous fluids containing calcium ions and bicarbonate ions; as fluid pressure is reduced during production of the fluids, carbon dioxide is released and calcium carbonate precipitates, according to the equation:

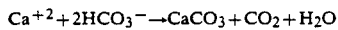

$$Ca^{+2} + 2HCO_3^- \rightarrow CaCO_3 + CO_2 + H_2O$$

Another common scale is alkaline earth metal sulfates formed during production of fluids which contain high concentrations of dissolved alkaline earth and sulfate ions. Other scales can be formed by corrosion of equipment in the well, particularly steel tubing and casing, which yield various compounds, including iron and other metal sulfides, oxides, and the like.

Scale materials tend to form in a formation very close to a producing well, normally only a few inches into the formation, and in the tubing, casing, and other equipment of the well. Scale deposits in pores of the producing formation, perforations in well casing, and other openings necessary for fluid flow, sometimes causing extremely rapid declines in that flow.

It is customary to deal with scale deposits by techniques such as acidizing, wherein an acid capable of dissolving the scale is injected into areas suspected to contain scales. Acidizing is effective in many cases, but has concomitant disadvantages, not the least of which is rapid corrosion of metals contacted by the acids.

Case, in U.S. Pat. No. 2,877,848, and C. M. Shaughnessy et al., "EDTA Removes Formation Damage at Prudhoe Bay," *Journal of Petroleum Technology*, October 1983, pages 1783-1791, describe methods for removing scale from formations and wellbores, by pumping aqueous solutions of ethylenediaminetetraacetic acid salts into the wells and formations.

Another very common phenomenon tending to reduce fluid flow in formations which contain finely divided particulate matter is the migration of such particles into constrictions of the formation pores. Particularly when the particles are silt-sized or smaller, even relatively low fluid flow rates through a formation can cause movement of the particles. Also, certain types of water-sensitive clays which can be present in a formation as fine particles, e.g., montmorillonite, can swell and decrease the permeability of the formation if contacted by water.

Various treatments have been proposed to minimize damage to formation permeability by fine particles. Such treatments have included injecting zirconium oxychloride to stabilize clays, converting clays from the swelling sodium or lithium forms to a lesser swelling cation form, and injecting various amine or hydroxyaluminum compositions

SUMMARY OF THE INVENTION

The invention is a method for treating a subterranean formation penetrated by a well, or for treating well equipment, to remove scale and to stabilize fine particles present in the formation, which method comprises injecting into the well an aqueous composition containing at least one aminopolycarboxylic acid component and at least one water-soluble organosilicon component.

Scale removal is thought to be accomplished by the aminopolycarboxylic acid component, while the organosilicon component apparently reacts with siliceous surfaces in the formation, coats fine particles, and binds the particles in place to restrict their subsequent movement.

DETAILED DESCRIPTION OF THE INVENTION

The present invention is a method for simultaneously removing scale from a formation, or from equipment in a well penetrating the formation, and stabilizing fine particulate matter in the formation. Use of the method typically results in an increased fluid flow through the formation and well.

For purposes of the present invention, "formation fines" are defined as particles small enough to pass through openings of the smallest sieve commonly available (400 U.S. Mesh, or 37 micron openings). The composition of the fines can be widely varied, as there are many different materials present in subterranean formations. Broadly, fines may be classified as being quartz, or other minerals such as: feldspars; muscovite; calcite, dolomite and other carbonate minerals; barite; water-swellable clays, including montmorillonite, beidellite, nontronite, saponite, hectorite and sauconite (with montmorillonite being the clay material most commonly encountered); non-water-swellable clays, including kaolinite and illite; and amorphous materials. Fines are present to some extent in most sandstones, shales, limestones, dolomites and the like. Problems associated with the presence of fines are often most pronounced in sandstone-containing formations.

Broadly stated, the method of the invention comprises injecting into a well a treatment composition, comprising an aqueous solution containing at least one aminopolycarboxylic acid component and at least one organosilicon compound.

Suitable aminopolycarboxylic acids for the practice of this invention are those which have chelating ability and which, either in the acid form or as a salt, have sufficient solubility in water to produce an effective scale removal composition. Commercially available compounds which are useful include, but are not limited to, iminodiacetic acid, methyliminodiacetic acid, nitrilotriacetic acid, ethylenediaminetetraacetic acid, diethylenetriaminepentaacetic acid, 1,2-diaminocyclohexanetetraacetic acid, N-hydroxyethylethylenediaminetriacetic acid, and related compounds. In the remainder of this description, the invention will be discussed primarily with reference to the use of ethylenediaminetetraacetic acid (EDTA) and its salts; it is to be understood that the invention is not limited to the use of only EDTA. It should also be understood that the term "aminopolycarboxylic acid" is meant to include mixtures of two or more such acids or salts.

Suitable water-soluble organosilicon compounds for the invention include, without limitation, amino silane compounds such as 3-aminopropyltriethoxy silane and N-2-aminoethyl-3-aminopropyltriethoxy silane, and vinyl silane compounds such as vinyl tris(2-methoxyethoxy)silane. However, as discussed by M. R. Rosen, "From Treating Solution to a Filler Surface and Beyond. The Life History of a Silane Coupling Agent," *Journal of Coatings Technology*, Vol. 50, No. 644, pages 70-82 (1978), many organosilicon compounds are water-soluble for prolonged periods of time after they hydrolyze to form silanols. For purposes of the present invention, then, compounds which form water-soluble silanols by hydrolysis will be considered as equivalent to organosilicon compounds which are initially water-soluble.

Among the organosilanes suitable for use in this invention are those having the formula:

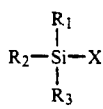

wherein X is a halogen, $R_1$ is an organic radical having from 1 to 50 carbon atoms, and $R_2$ and $R_3$ are the same or different halogens or organic radicals having from 1 to 50 carbon atoms. Preferably, X is a halogen selected from the group consisting of chlorine, bromine and iodine with chlorine being preferred, $R_1$ is an alkyl, alkenyl, or aryl group having from 1 to 18 carbon atoms and $R_2$ and $R_3$ are the same or different halogens, or alkyl, alkenyl, or aryl groups having from 1 to 18 carbon atoms.

Suitable specific organosilanes include methyldiethylchlorosilane, dimethyldichlorosilane, methyltrichlorosilane, dimethyldibromosilane, diethyldiiodosilane, dipropyldichlorosilane, dipropyldibromosilane, butyltrichlorosilane, phenyltribromosilane, diphenyldichlorosilane, tolyltribromosilane, methylphenyldichlorosilane, and the like.

Among the esters of the organosilanes suitable for use in this invention are those having the formula:

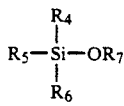

wherein $R_4$, $R_5$ and $R_6$ are independently selected from hydrogen and organic radicals having from 1 to 50 carbon atoms, provided not all of $R_4$, $R_5$, and $R_6$ are hydrogen and $R_7$ is an organic radical having from 1 to 50 carbon atoms. Preferably, $R_4$, $R_5$, and $R_6$ are independently selected from hydrogen, amine, alkyl, alkenyl, aryl, and carbhydryloxy groups having from 1 to 18 carbon atoms, with at least one of the $R^4$, $R_5$, and $R_6$ groups not being hydrogen, and $R_7$ is selected from amine, alkyl, alkenyl, and aryl groups having from 1 to 18 carbon atoms. When $R_4$, $R_5$, and/or $R_6$ are carbhydryloxy groups, alkoxy groups are preferred.

Suitable specific esters of organosilanes include methyltriethoxysilane, dimethyldiethoxysilane, methyltrimethoxysilane, divinyldimethoxysilane, divinyldi-2-methoxyethoxy silane, di(3-glycidoxypropyl) dimethoxysilane, vinyltriethoxysilane, vinyltris-2-methoxyethoxysilane, 3-glycidoxyproplytrimethoxysilane, 3-methacryloxproplytrimethoxysilane, 2-(3,3epoxycyclohexyl)ethyltrimethoxysilane, N-2-aminoethyl-3-propylmethyldimethoxysilane, N-2-aminoethyl-3-propyltrimethoxysilane, N-2-aminoethyl-3-aminopropyltrimethoxysilane, 3-amino-propyltriethoxysilane, and the like.

For purposes of brevity and clarity, the terms "amine," "alkyl," "alkenyl," "aryl," and "carbhydryloxy" have been used above to describe substituents of organosilanes and esters of organosilanes which are useful in the practice of the invention. It is to be understood that these substituents may themselves be substituted or unsubstituted and that each, except for aryl species, may be branched or unbranched.

In the treatment composition, the aminopoly-carboxylic acid component can comprise about 0.1 to about 50 percent by weight, and the organosilicon component can comprise about 0.1 to about 15 percent by weight, although, of course, the solubility limit of a component should not be exceeded. Typically, the aminopolycarboxylic acid and organosilicon components each comprise about 0.5 percent by weight to about 10 percent by weight of the composition.

To prepare the composition, an aqueous medium (water or a desired salt solution) is placed in a suitable mixing vessel and remaining components are added. It is normally preferred to add the organosilicon component before adding the aminopolycarboxylic acid component, since some organosilicon compounds assist in dissolving solid aminopolycarboxylic acid compounds. Other components, such as compounds to prevent water blockage of the formation and corrosion inhibitors, can be added at any point. The mixing vessel should provide sufficient agitation to produce a homogeneous solution of the components.

While the reaction of the organosilicon compound with materials in the formation is not completely understood, and while the invention is not to be held to any theory of operation, it is believed that the organosilicon compound condenses on and reacts with active sites on siliceous surfaces, with which it comes in contact, to form a polymer. It is believed that an organosilcon monomer first hydrolyzes and forms a reactive intermediate and either the acid or alcohol depending on the type of monomer:

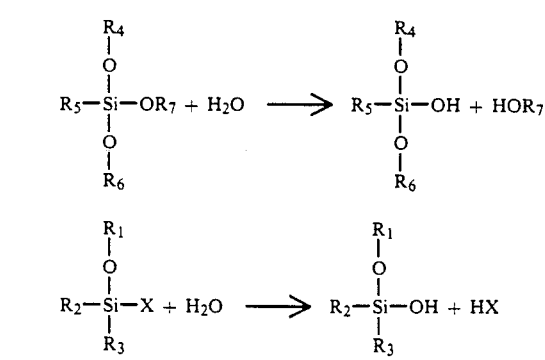

The reactive intermediates, "silanols," then condense to begin formation of the polymer:

The growth of the polymer can proceed as hydrolysis and condensation continue.

The silanol can also react with active sites on the rock to covalently bind the polymer to it:

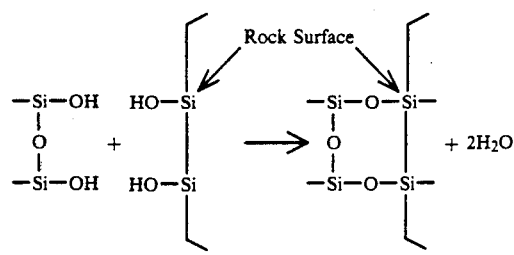

The polymer becomes covalently bonded to any siliceous surface, including clays and the quartz grains which define the pore structure in sandstones or poorly consolidated or unconsolidated formations containing siliceous materials. The polymer acts as a "glue" which coats formation fines and binds them in place, thus reducing their movement when a fluid flows through the formation and decreasing their reactivity toward acids. The polymer also coats any water-swellable clays and thereby reduces their subsequent swelling by water-containing fluids.

In addition to the aminopolycarboxylic acid and organosilicon compound components, a treatment composition can contain various additives. Glycol ether compounds can be added to prevent emulsion blocks. Corrosion inhibitors are frequently added to minimize attack of ferrous metals by the aminopolycarboxylic acid; these inhibitors can be many of those used to acidizing compositions, such as thiophenols, nitrogen heterocyclics, substituted thioureas, rosin amine derivatives, acetylenic alcohols, arsenic compounds, and the like.

For practicing the method of the invention, it is sometimes preferred to pre-flush the formation by injecting hydrocarbon liquids. These liquids, which can include aromatic solvents, are used to dissolve organic materials, such as wax and heavy oil, from mineral or scale surfaces to permit reaction with the treatment composition. The liquids may also serve to separate the composition from crude oil, helping to prevent the formation of sludges or emulsions caused by the aqueous-oil interaction. The solvent can also contain a glycol ether compound, usually in concentrations of 5 to 10 percent, to help remove emulsion blocks downhole or to leave mineral and scale surfaces water-wet to aid their reaction with treatment composition. Ethylene glycol monobutyl ether is an example of a compound which can be used. The volume of preflush is typically about 1 to about 500 gallons per vertical foot of formation to be treated.

Treatment is conducted by injecting the composition through a well into the formation, normally using pressures sufficient to penetrate the formation. Typical volumes of treatment composition used are about 1 to about 500 gallons per vertical foot of formation to be treated. Penetration can be improved by following this injection with injecting into the formation an afterflush fluid, typically comprising an aqueous solution of a salt, such as ammonium chloride, or a liquid which is immiscible with the treatment composition, such as a hydrocarbon liquid (crude oil, diesel fuel, kerosene, and the like). The treatment composition itself and afterflushes often contain a glycol ether compound, such as ethylene glycol monobutyl ether. The glycol ether tends to prevent emulsion blocks and to retard adsorption of other treatment additives onto the formation face. However, it does not prevent the reaction of the water-soluble organosilanes with the formation. When used in an afterflushing fluid, such as a hydrocarbon liquid, the glycol ether can aid in the removal of treatment additives, such as corrosion inhibitors, which may have adsorbed on the formation or could restrict flow of fluid through the formation. The afterflush assists in displacing the treatment composition into the formation, and is typically about 1 to about 500 gallons per vertical foot of formation to be treated.

After the treatment composition has had sufficient time to react with the well scale and/or the formation, the composition is removed from the formation through the well. Following the removal operation, the well can be used for its normal desired purpose, e.g., production from, or injection into, the formation.

The invention is further described by the following examples which are illustrative of various aspects of the invention and are not intended as limiting the scope of the invention as defined by the appended claims. In the examples, all percentage composition values are expressed on a weight basis, except as otherwise noted.

The general procedure used for tests reported in the following examples 1 through 3 involves cylindrical core samples taken from subterranean formations. Samples are placed in Hassler sleeve-type core holders and a pressure of about 1000 p.s.i.g. is applied to simulate overburden. The sample is evacuated, saturated with a 2 weight percent aqueous sodium chloride brine, and then permeability is established by flowing kerosene through the sample with a "pulseless" liquid chromatography pump; data from a differential pressure transducer are used to calculate permeability with the Darcy equation. This original permeability is assigned a value of "100 percent" for comparison with subsequent values obtained during the sample; the direction of kerosene flow is considered to be a "production" mode for the tests. Any later fluid flow in the opposite direction is considered to be an "injection" mode of operation.

In following Examples 4 through 6, the same general procedure is followed, except that permeability is established by flowing aqueous fluids through the samples.

EXAMPLE 1

An experiment is performed to determine the effects of core sample treatment with an aminopolycarboxylic acid solution, followed by treatment with an aqueous solution of an organosilicon compound. The sample used is a sandstone containing feldspar, smectite, quartz, chlorite, calcium carbonate, and iron carbonate fine particles.

Following determination of the "100 percent" permeability with kerosene, the following are sequentially passed through the sample at 120° F. in the injection mode, as a "treatment":

(a) 300 milliliters of 10 volume percent ethylene glycol monobutyl ether (EGMBE) in kerosene, at a rate of 5.5 ml/minute;

(b) 600 milliliters of a 9 percent aqueous solution of disodium EDTA, containing 3 volume percent EGMBE, at a rate of 10 ml/minute;

(c) 600 milliliters of an aqueous solution containing 2 percent disodium EDTA, 3 percent ammonium chloride, and 3 volume percent EGMBE, at a rate of 10 ml/minute;
(d) 600 milliliters of an aqueous solution containing 9 percent disodium EDTA and 3 volume percent EGMBE, at a rate of 10 ml/minute;
(e) 200 milliliters of a 3 percent aqueous ammonium chloride solution, at a rate of 10 ml/minute;
(f) the solution described in (a) above, at the same rate; and
(g) 200 milliliters of kerosene, at a rate of 10 ml/minute.

The sample is then returned to the production mode and the permeability is measured by flowing a 2 percent aqueous sodium chloride solution through the core at varying rates. Finally, permeability is determined for kerosene flow, as a comparison with the original value of permeability.

Results are as shown in Table 1, wherein permeability is expressed as Darcy $\times 10^{-3}$ (md) and the various permeabilities obtained with different sodium chloride solution flowrates are shown separately. A permeability range indicates a value obtained at the beginning of flow and the value at conclusion of flow, at a given rate.

TABLE 1

| Fluid | Flow Rate (ml/min) | Permeability (md) | % of Original Permeability |
|---|---|---|---|
| Kerosene | 2.2 | 76.0 | 100 |
| Treatment | — | — | — |
| 2% NaCl | 2.2 | 26.3–26.6 | 34.6–35.0 |
| | 10.5 | 30.7–18.6 | 40.4–24.5 |
| | 5.4 | 18.6–17.1 | 24.5–22.5 |
| | 2.2 | 16.9–16.2 | 22.2–21.3 |
| Kerosene | 2.2 | 61.7 | 81.2 |

Samples of solutions recovered after passage through the core are analyzed for calcium, magnesium, and iron to determine whether or not fines were dissolved by the aminopolycarboxylic acid. Results are as shown in Table 2, wherein concentrations are expressed in milligrams per liter (mg/l).

TABLE 2

| Treatment Step | Ca mg/l | Mg mg/l | Fe mg/l |
|---|---|---|---|
| (b) | 171 | 15 | 226 |
| (c) | 77 | 4.1 | 114 |
| (d) | 39 | 2.9 | 98 |

The results of this example show that an aminopolycarboxylic acid solution will remove fines from the core sample, but at the cost of decreased permeability, attributed to damage (movement of fine particles) caused by fluid flow through the core.

EXAMPLE 2

At the conclusion of the experiment of the preceding example, a second "treatment" is performed on the core sample, by sequentially passing the following through the sample at 120° F. in the injection mode:
(a) 300 milliliters of 10 volume percent EGMBE in kerosene, at a rate of 5.5 ml/minute;
(b) 1800 milliliters of an aqueous solution containing 2 volume percent 3-aminopropyltriethoxysilane, 3 volume percent EGMBE, and 3 percent ammonium chloride, at a rate of 10 ml/minute;
(c) 200 milliliters of a 3 percent aqueous ammonium chloride solution, at a rate of 10 ml/minute;
(d) the solution described in (a) above, at the same rate; and
(e) 200 milliliters of kerosene, at a rate of 10 ml/minute.

The sample is again returned to the production mode and permeability measurements are made with sodium chloride solution, and kerosene, as in the preceding example. Results are as shown in Table 3.

TABLE 3

| Fluid | Flow Rate (ml/min) | Permeability (md) | % of Original Permeability |
|---|---|---|---|
| 2% NaCl | 2.2 | 25.6–24.7 | 33.7–32.5 |
| | 10.5 | 29.5–27.0 | 38.8–35.5 |
| | 5.5 | 26.2–25.3 | 34.5–33.2 |
| | 2.2 | 24.7–23.3 | 32.5–30.7 |
| Kerosene | 2.2 | 64.0 | 84.2 |

These results show that, following treatment with an organosilicon compound, further damage to the core permeability does not occur. Also, a slight permeability enhancement in the damaged sample is observed.

EXAMPLE 3

A core sample of the sandstone described in Example 1 is subjected to an experiment, as in that example except that the "treatment" consists of sequentially passing the following through the sample at 120° F., in the injection mode:
(a) 300 milliliters of 10 volume percent EGMBE in kerosene, at a rate of 5.5 ml/minute;
(b) 600 milliliters of an aqueous solution containing 9 percent disodium EDTA, 2 volume percent 3-aminopropyltriethoxysilane (3-ATES), and 3 volume percent EGMBE, at a rate of 10 ml/minute;
(c) 600 milliliters of an aqueous solution containing 2 percent disodium EDTA, 2 volume percent 3-ATES, 3 volume percent EGMBE, and 3 percent ammonium chloride, at a rate of 10 ml/minute;
(d) 600 milliliters of an aqueous solution containing 9 percent disodium EDTA, 2 volume percent 3-ATES, and 3 volume percent EGMBE, at a rate of 10 ml/minute;
(e) 200 milliliters of a 3 percent aqueous solution of ammonium chloride, at a rate of 10 ml/minute;
(f) 300 milliliters of a 10 volume percent EGMBE solution in kerosene, at a rate of 5 ml/minute; and
(g) 300 milliliters of kerosene, at a rate of 10 ml/minute.

Permeability measurements are made after this treatment, as in the preceding examples, by flowing sodium chloride solution, and kerosene, using the previously described procedure. Results are as shown in Table 4.

TABLE 4

| Fluid | Flow Rate (ml/min) | Permeability (md) | % of Original Permeability |
|---|---|---|---|
| Kerosene | 2.3 | 112 | 100 |
| Treatment | — | — | — |
| 2% NaCl | 2.2 | 50.6 | 45.2 |
| | 11.0 | 86.3 | 77.1 |
| | 5.57 | 86.7 | 77.4 |
| Kerosene | 2.3 | 105 | 93.8 |

As in Example 1, samples of treatment fluids are collected after their passage through the core, and are analyzed for calcium, magnesium, and iron to determine whether or not soluble fines were dissolved. Results are as shown in Table 5.

TABLE 5

| Treatment Step | Ca mg/l | Mg mg/l | Fe mg/l |
|---|---|---|---|
| (b) | 850 | 18 | 40 |
| (c) | 113 | 7.6 | 27 |
| (d) | 63 | 7.1 | 32 |

Results of this example show that a solution containing an aminopolycarboxylic acid and an organosilicon compound both solubilizes fine particles and stabilizes against permeability reductions due to fluid flow.

The particular treatment compositions used in this example are considered to offer benefits as follows:

(1) the solution of step (a) is intended to clean oils from mineral surfaces, to improve contact with the later-injected aqueous fluids; EGMBE improves water-wetability of those surfaces;

(2) the high concentration of aminopolycarboxylic acid in the solution of steps (b) and (d) is very effective in dissolving scales, and the organosilicon compound concentration assists in preventing fines movement; EGMBE maintains water-wetability of the surfaces and prevents adsorption of other additives (e.g., corrosion inhibitors) on mineral surfaces;

(3) the solution of step (c) is more effective in stabilizing fine particles than is the solution of steps (b) and (d); ammonium chloride assists in maintaining a cation concentration approximately the same as the step (b) or (d) solution, preventing clay dispersion;

(4) the ammonium chloride solution of step (e) primarily displaces previous treatment formulations into the pores of a formation, and is used in the experiment to more realistically simulate field procedures; and (5) the solution of step (f) is used to displace treatment chemicals, remove materials such as corrosion inhibitors which may be adsorbed on surfaces, and establishes oil-wet surfaces to facilitate the production of oil.

EXAMPLE 4

A sample of the sandstone from the same formation as that of preceding Example 1 is flooded with 2 percent aqueous sodium chloride solution and then is used to evaluate scale removal and fines fixing treatment with an aqueous solution containing 3 volume percent 3-aminopropyltriethoxy silane, 9 percent disodium EDTA, and 0.5 percent sodium chloride.

Results are as shown in Table 6, which also contains a description of the fluids and conditions used in the evaluation.

These results indicate greater than a two-fold increase in the water-damaged permeability after treatment, with an attendant protection against further damage from water contact.

EXAMPLE 5

A sample of sandstone from the same formation as that of preceding Example 1 is subjected to a procedure, as in Example 4, to evaluate treatment with an aqueous solution containing 3 volume percent 3-aminopropyltriethoxysilane, 9 percent 1,2-diaminocyclohexanetetraacetic acid, and 0.5 percent sodium chloride.

Results, as shown in Table 7, indicate a significant increase in the water-damaged permeability and a protection against further water damage.

EXAMPLE 6

Core samples from a sandstone formation which contains fine particles of kaolinite, feldspar, quartz, and iron oxide are flooded with 3 percent sodium chloride and tested for permeability to a 3 percent aqueous sodium chloride solution. One sample is loaded with calcium carbonate scale (by passing a solution of 2 percent calcium chloride and 3 percent sodium bicarbonate through the sample), and treated with an aqueous solution containing 1 volume percent 3-aminopropyltriethoxysilane, 5 percent disodium EDTA, and 2 percent sodium chloride.

Results are as shown in Table 8, wherein the first sample is tested only for sensitivity to water, while the second sample is used to generate and remove scale. The treatment dissolves essentially all of the calcium carbonate scale, and protects against water damage.

Various embodiments and modifications of this invention have been described in the foregoing discussion and examples, and further modifications will be apparent to those skilled in the art. Such modifications are included within the scope of the invention as defined by the following claims.

TABLE 6

| Fluid Injected | Flow Direction | Volume, ml | Rate, ml/min. | Temp., °F. | Permeability, md | % of Original Permeability |
|---|---|---|---|---|---|---|
| 2% NaCl | Production | 40 | 4.66 | 70 | 10.8 | 100 |
| 2% NaCl | Production | 185 | 4.60 | 70 | 10.1 | 93.5 |
| H$_2$O | Production | 400 | 4.68 | 70 | 3.97 | 36.9 |
| Treatment | Injection | 200 | 2.0 | 120 | — | — |
| 2% NaCl | Injection | 60 | 2.0 | 120 | — | — |
| 2% NaCl | Production | 200 | 4.70 | 70 | 8.19 | 76.0 |
| H$_2$O | Production | 175 | 4.68 | 70 | 8.00 | 74.3 |

TABLE 7

| Fluid Injected | Flow Direction | Volume, ml | Rate, ml/min. | Temp., °F. | Permeability, md | % of Original Permeability |
|---|---|---|---|---|---|---|
| 2% NaCl | Production | 200 | 4.71 | 76 | 40.9 | 100 |
| H$_2$O | Production | 200 | 4.80 | 76 | 6.74 | 16.5 |
| 2% NaCl | Production | 200 | 4.68 | 76 | 6.56 | 16.0 |
| Treatment | Injection | 200 | 2.0 | 113 | — | — |
| 2% NaCl | Injection | 60 | 2.0 | 113 | — | — |
| 2% NaCl | Production | 200 | 4.72 | 75 | 15.26 | 37.3 |

TABLE 7-continued

| Fluid Injected | Flow Direction | Volume, ml | Rate, ml/min. | Temp., °F. | Permeability, md | % of Original Permeability |
|---|---|---|---|---|---|---|
| H$_2$O | Production | 200 | 4.74 | 75 | 14.96 | 36.6 |

TABLE 8

| Fluid Injected | Flow Direction | Volume, ml | Rate, ml/min. | Temp., °F. | Permeability, md | % of Original Permeability |
|---|---|---|---|---|---|---|
| 3% NaCl | Production | 435 | 5.30 | 72 | 15.1 | 100 |
| H$_2$O | Production | 638 | 2.66 | 72 | 8.58 | 56.9 |
| 3% NaCl | Production | 200 | 1.00 | 72 | 35.6 | 100 |
| "Scale" | Production | 660 | 0.80 | 72 | — | — |
| 3% NaCl | Production | 500 | 4.38 | 72 | 10.1 | 28.4 |
| Treatment | Injection | 90 | 3.00 | 115 | — | — |
| 3% NaCl | Production | 340 | 4.77 | 71 | 34.2 | 96.0 |
| H$_2$O | Production | 145 | 5.00 | 71 | 42.6 | 119.9 |

We claim:

1. An aqueous solution for scale removal, the solution comprising:
   (a) an aminopolycarboxylic compound selected from the group consisting of aminopolycarboxylic acids, aminopolycarboxylic salts, and mixtures thereof, the solution comprising about 0.1 weight percent of the aminopolycarboxylic compound to about the solubility limit of the aminopolycarboxylic compound in the solution and the aminopolycarboxylic compound having a chelating ability and sufficient solubility in water to produce an effective scale removal solution; and
   (b) at least about 1.8 weight percent of a water-soluble organosilicon compound.

2. The solution of claim 1 comprising at least about 2.7 weight percent of the organosilicon compound.

3. The aqueous solution of claim 1 comprising about 1.8 weight percent of the organosilicon compound to about the solubility limit of the organosilicon compound in the solution.

4. The solution of claim 1 comprising about 1.8 to about 15 weight percent of the organosilicon compound.

5. The solution of claim 1 comprising about 2.7 to about 15 weight percent of the organosilicon compound.

6. The solution of claim 1 comprising about 2.7 to about 10 weight percent of the organosilicon compound.

7. The solution of claim 1 comprising about 0.1 to about 50 weight percent of the aminopolycarboxylic compound.

8. The solution of claim 1 comprising about 0.5 to about 10 weight percent of the aminopolycarboxylic compound.

9. The solution of claim 1 comprising about 0.1 to about 50 weight percent of the aminopolycarboxylic compound and about 1.8 to about 15 weight percent of the organosilicon compound.

10. The solution of claim 1 comprising about 0.5 to about 50 weight percent of the aminopolycarboxylic compound and about 2.7 to about 15 weight percent of the organosilicon compound.

11. The solution of claim 1 comprising about 0.5 to about 10 weight percent of the aminopolycarboxylic compound and 2.7 about to about 10 weight percent of the organosilicon compound.

12. The solution of claim 1 further comprising a corrosion inhibitor selected from the group consisting of thiophenols, nitrogen heterocycles, substituted thioureas, rosin amine derivatives, acetylenic alcohols, and arsenic compounds.

13. The solution of claim 1 wherein the water-soluble organosilicon compound is selected from the group consisting of amino silanes, organosilanes, esters of organosilanes, vinyl silane, and mixtures thereof.

14. An aqueous solution for scale removal, the solution comprising:
   (a) about 0.1 to about 50 weight percent of an aminopolycarboxylic compound selected from the group consisting of aminopolycarboxylic acids, aminopolycarboxylic salts, and mixtures thereof, the aminopolycarboxylic compound having a chelating ability and sufficient solubility in water to produce an effective scale removal solution; and
   (b) about 1.8 to about 15 weight percent of a water-soluble organosilicon compound selected from the group consisting of amino silanes, organosilanes, esters of organosilanes, vinyl silane, and mixtures thereof.

15. The solution of claim 14 wherein the aminopolycarboxylic compound is selected from the group consisting of iminodiacetic acid, methyliminodiacetic acid, nitrilotriacetic acid, ethylenediaminetetraacetic acid, diethylenetriaminepentaacetic acid, 1,2-diaminocyclohexanetetraacetic acid, N-hydroxyethylethylenediaminetriacetic acid, salts thereof, and mixtures thereof, and the organosilicon compound is an organosilane having the formula

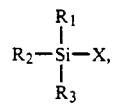

X being a halogen;

R$_1$ being an organic radical having from 1 to 50 carbon atoms; and

R$_2$ and R$_3$ each being independently selected from the group consisting of halogen and organic radical having from 1 to 50 carbon atoms.

16. The solution of claim 14 wherein the aminopolycarboxylic compound is selected from the group consisting of iminodiacetic acid, methyliminodiacetic acid, nitrilotriacetic acid, ethylenediaminetetraacetic acid, diethylenetriaminepentaacetic acid, 1,2-diaminocyclohexanetetraacetic acid, N-hydroxyethylethylenediaminetriacetic acid, salts thereof, and mixtures thereof, and an ester of an organosilane having the formula
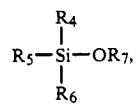
$R_4$, $R_5$, and $R_6$ being independently selected from the group consisting of hydrogen, amine, and organic radicals having from 1 to 50 carbon atoms, provided that $R_4$, $R_5$, and $R_6$ are not all hydrogen; and $R_7$ being selected from the group consisting of amine and organic radicals having from 1 to 50 carbon atoms.
* * * * *

UNITED STATES PATENT AND TRADEMARK OFFICE
CERTIFICATE OF CORRECTION

PATENT NO. : 5,051,197

DATED : September 24, 1991

INVENTOR(S) : Leonard J. Kalfayan, David R. Watkins, and Gregory S. Hewgill

It is certified that error appears in the above-identified patent and that said Letters Patent is hereby corrected as shown below:

COLUMN 11
Claim 11, line 64, replace "2.7 about" with -- about 2.7 to --.

Signed and Sealed this

Second Day of February, 1993

Attest:

STEPHEN G. KUNIN

Attesting Officer

Acting Commissioner of Patents and Trademarks